United States Patent [19]

Rouch

[11] 3,887,245

[45] June 3, 1975

[54] PIVOTED PAD BEARING APPARATUS AND METHOD FOR BIDIRECTIONAL ROTATION

[75] Inventor: Keith E. Rouch, Greendale, Wis.

[73] Assignee: Allis-Chalmers Corporation, Milwaukee, Wis.

[22] Filed: Apr. 8, 1974

[21] Appl. No.: 459,120

[52] U.S. Cl..................... 308/1 R; 308/73; 308/116
[51] Int. Cl. ............................................ F16c 17/06
[58] Field of Search.............. 308/1 R, 73, 116, 119, 308/72, 122

[56] References Cited
UNITED STATES PATENTS

| | | | |
|---|---|---|---|
| 2,363,260 | 11/1944 | Peskin................................... | 308/73 |
| 3,351,394 | 11/1967 | Hooker............................ | 308/122 X |
| 3,604,767 | 9/1971 | Decker................................. | 308/73 |
| 3,703,322 | 11/1971 | Gustafsson........................... | 308/122 |

*Primary Examiner*—M. Henson Wood, Jr.
*Assistant Examiner*—Michael Mar
*Attorney, Agent, or Firm*—Robert C. Sullivan

[57] ABSTRACT

A pivoted pad journal bearing for and method of supporting a journal member for bidirectional rotation with the effect of an offset pivot on the pivoted bearing pad, but without the necessity of mechanically shifting the bearing pad pivot point with change in direction of rotation of the journal. An oil distribution groove is provided in the journal bearing face of the pivoted bearing pad contiguous but spaced from each of the opposite circumferentially spaced first and second edges of the bearing pad. For a given direction of rotation of the journal, the first edge will be the "leading" edge, while the second edge will be the "trailing" edge. For the opposite direction of rotation, the converse will be true. The bearing pad includes a pivotal support permanently located midway between the first and second edges. Each of the opposite oil distribution grooves is adapted to be connected to a low pressure oil supply. For a given direction of rotation, means are provided for maintaining the oil distribution groove contiguous the "leading" edge at pump output pressure and for maintaining the oil distribution groove contiguous the "trailing" edge at sump pressure (essentially zero pressure). This provides a pressure profile of the oil film at the journal bearing surface of the pivoted bearing pad such that the mechanically fixed pivot point is effectively located further from the "leading" edge than from the effective "trailing" edge of the pivoted bearing pad, thus giving the advantages and effect of an offset pivot without the necessity of mechanically shifting the pivot.

12 Claims, 8 Drawing Figures

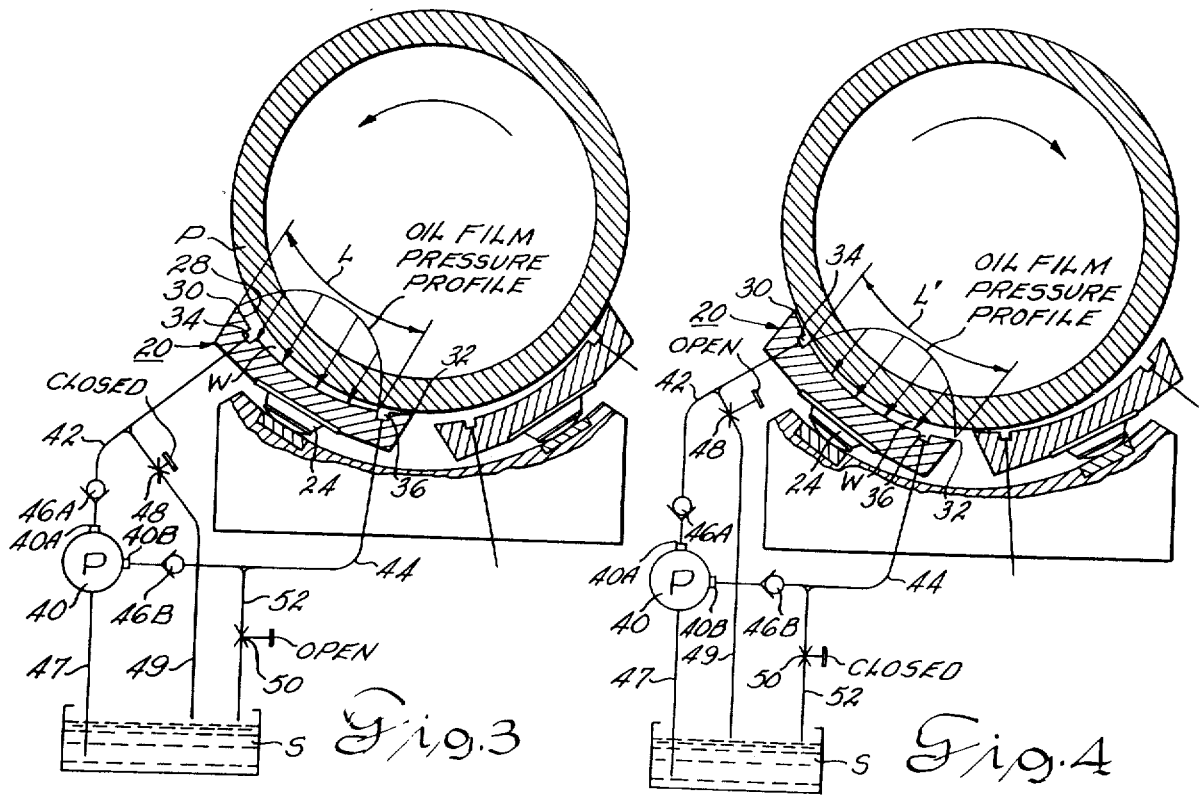
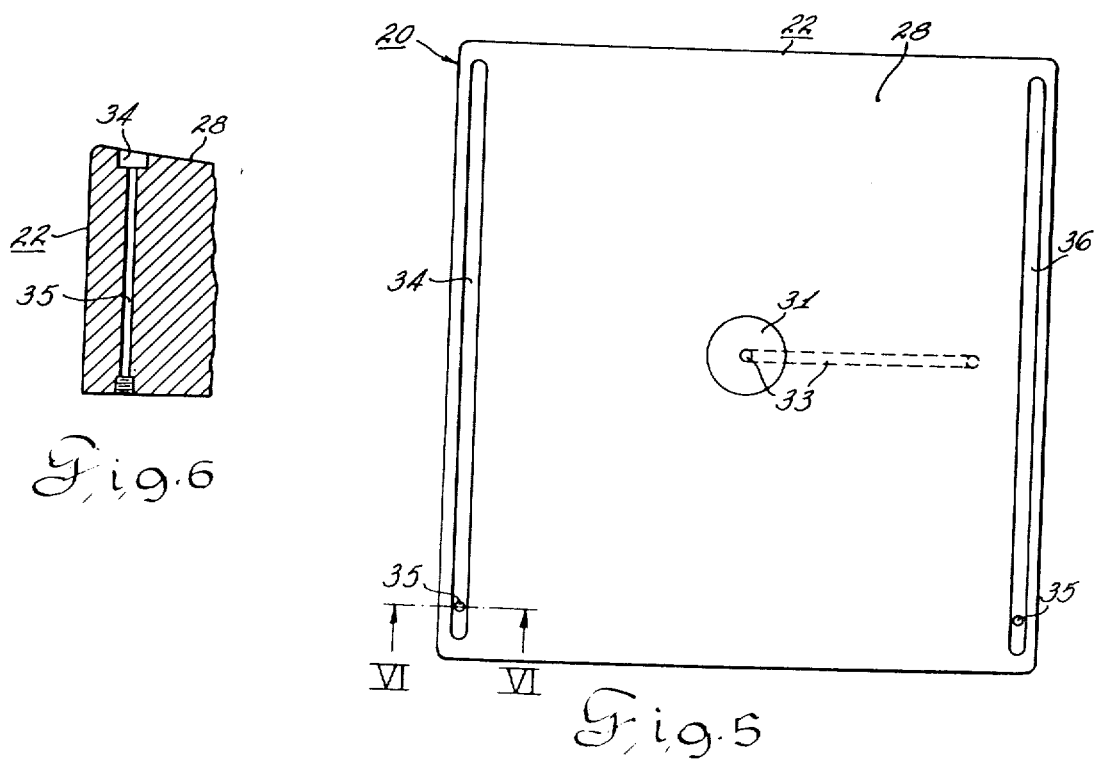

3,887,245

PIVOTED PAD BEARING APPARATUS AND METHOD FOR BIDIRECTIONAL ROTATION

BACKGROUND OF THE INVENTION

1. Field of the Invention

This invention relates to journal bearings, and more particularly to a journal bearing of the pivoted pad type which is adapted for bidirectional rotation of the journal which is supported for rotation, and to a method for shifting the effective location of the pivot point of the pivoted bearing pad without the necessity of mechanically shifting the pivot point.

2. Description of the Prior Art

It has been known in the prior art to provide an offset pivot for a pivoted bearing pad since the use of an offset pivot is known to facilitate the formation of the hydrodynamic lubricating oil film wedge between the bearing surface and the rotating journal. When using an offset pivot for a pivoted bearing pad, the pivot point of the bearing pad is set a greater distance away from the "leading" edge of the pivoted bearing pad than from the "trailing" edge of the bearing pad. This facilitates formation of the hydrodynamic lubricating oil film wedge in the region of the leading edge. The "leading edge" of the pivoted bearing pad is defined as that edge of the bearing pad first reached by a given point P on the periphery of the rotating journal for a given direction of rotation of the journal. If the direction of rotation of the journal is reversed, the relative position of the "leading" edge and "trailing" edge of the pivoted bearing pad is reversed.

However, in the prior art types of pivoted bearing pad arrangements using an offset pivot when it was desired to change the direction of rotation of the journal member which was journalled for rotation in the bearing, it was necessary to mechanically shift the pivot point of the pivoted bearing pad to provide the optimum location of the pivot for the particular direction of rotation in which it was desired to rotate the journal; that is, if it was desired to change the direction of rotation of the journal from, for example, clockwise rotation to counterclockwise rotation, it was necessary to mechanically shift the pivot point of the pivoted bearing pad in order to optimize the offset location of the pivot point for the new direction of rotation.

It is also recognized that centrally pivoted bearing pads can be operated bidirectionally. It is generally agreed, however, that good performance depends on development of a slightly greater radius of the pad compared to that of the journal, commonly referred to as "crown." This crown can be machined into the pad or developed because of structural deformation or thermal expansion effects.

STATEMENT OF THE INVENTION

Accordingly, it is an object of the present invention to provide a pivoted pad journal bearing which permits bidirectional rotation of the journal member journalled for rotation in the pivoted bearing pad without the necessity of mechanically shifting the location of the pivot of the pivoted bearing pad.

It is another object of the invention to provide a pivoted bearing pad arrangement and method in which the effective optimum location of the pivot point of the bearing pad for a given desired direction of rotation can be achieved without the necessity of mechanically shifting the pivot point, the change in effective pivot location being obtained instead by changing the pressure profile of the lubricating oil film at the interface between the bearing pad and the rotating journal.

It is a further object of the invention to provide a method of and apparatus for changing the effective location of the pivot point of a pivoted bearing pad as desired for a given direction of rotation by changing the oil film pressure profile at the interface between the bearing pad and the rotating journal, giving an effect similar to that of an offset pivot while still maintaining the pivot mechanically at a central location.

Further objects and advantages of the invention will become apparent from the following description taken in conjunction with the accompanying drawings in which:

BRIEF DESCRIPTION OF THE DRAWINGS

FIG. 3 is a schematic view of a rotating journal supported by pivoted bearing pads, showing the lubricating system connections and the relative position of the pivoted bearing pads for an assumed counterclockwise direction of rotation of the rotating journal relative to the view of FIG. 3;

FIG. 4 is a view similar to FIG. 3 but showing the lubricating system connections and relative position of the pivoted bearing pads for an assumed clockwise direction of rotation relative to FIG. 4;

FIG. 5 is a top plan view of one of the bearing pads showing the location of the oil distribution grooves;

FIG. 6 is a view in section along line VI—VI of FIG. 5;

In achievement of these objectives, there is provided in accordance with an embodiment of the invention, a pivoted pad journal bearing for and method of supporting a journal member for bidirectional rotation with the effect of an offset pivot on the pivoted bearing pad, but without the necessity of mechanically shifting the bearing pivot point with change in direction of rotation of the journal. An oil distribution groove is provided in the journal bearing face of the pivoted bearing pad contiguous but spaced from each of the opposite circumferentially spaced first and second edges of the bearing pad. For a given direction of rotation of the journal, the first edge will be the "leading" edge, while the second edge will be the "trailing" edge. For the opposite direction of rotation, the converse will be true. The bearing pad includes a pivotal support permanently located substantially midway between the first and second edges. Each of the opposite oil distribution grooves is adapted to be connected to a relatively low pressure oil supply. For a given direction of rotation, means are provided for maintaining the oil distribution groove contiguous the "leading" edge at pump output pressure and for maintaining the oil distribution groove contiguous the "trailing" edge at sump pressure (essentially zero pressure). This provides a pressure profile of the oil film at the journal bearing surface of the pivoted bearing pad such that the mechanically fixed pivot point is effectively located further from the "leading" edge than from the effective "trailing" edge of the pivoted bearing pad, thus giving the advantages and effect of an offset pivot without the necessity of mechanically shifting the pivot.

DESCRIPTION OF PREFERRED EMBODIMENT

Figure 1:
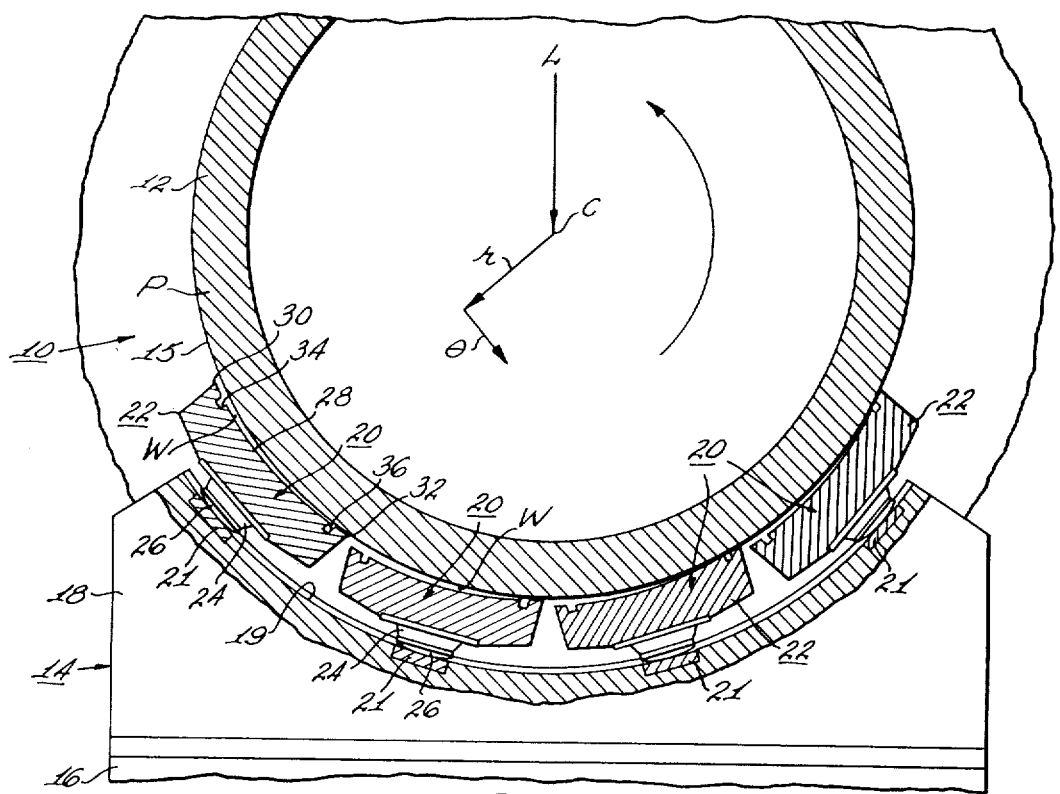
FIG. 1 is a view substantially along line I—I of FIG. 2 showing a grinding mill journalled for rotation in a bearing structure in accordance with the invention.
Figure 2:
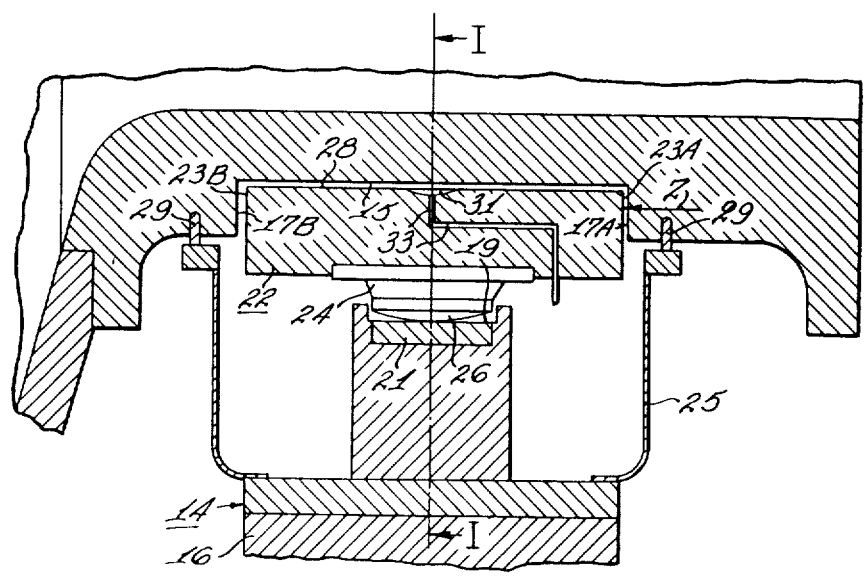
FIG. 2 is a view in axial section of the structure of FIG. 1.

Referring now to the drawings and more particularly to FIGS. 1 and 2, there is shown a rotary grinding mill generally indicated at 10 of the type used for grinding mineral ore or the like and having a hollow trunnion 12 which is mounted on a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill.

The bearing structure generally indicated at 14 comprises a normally vertical bearing pedestal 16 on the upper surface of which is suitably mounted an upwardly open bearing support 18. The upper surface 19 of bearing support 18 is an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the respective bearing pads 20 to be described. It will be noted that bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 25 is mounted on the upper end of bearing pedestal 16 in enclosing relation to the upper portion of the bearing structure to prevent contamination and loss of bearing lubricant. The upper end of housing 25 supports suitable seals 29 which engage the periphery of the rotating trunnion 12.

The journal bearing comprises a plurality of bearing pads (in the case of the illustrated embodiment, four) each respectively generally indicated at 20 which underlie the lower surface of trunnion 12 in supporting relation to the trunnion. Bearing pads 20 are spaced from each other a short distance circumferentially of trunnion 12. A minimum of two pivoted bearing pads 20 is required to support the rotating journal or trunnion 12. Each bearing pad 20 comprises a pad portion 22 which extends circumferentially and axially of the trunnion 12 in underlying supporting relation to the trunnion. Each bearing pad 20 also includes a pivot support portion 24 which is suitably secured to the radially outer portion of each respective pad portion 22 or which may be integral with the bearing pad portion 22. The radially outer surface 26 of each pivot portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed between the radially inner surface 28 of pad portion 22 and the radially outer cooperating surface 15 of the trunnion. The radially outer spherical or convex surface 26 of the pivot support 24 of each respective bearing pad 20 is adapted to bear against one of the inserts 21 in arcuate surface 19 of bearing support 18. Pivot support portion 24 and surface 26 thereof are substantially centrally located between the opposite edges 30 and 32 of bearing pad 20.

The outer periphery of the journal or trunnion 12 is provided with an axially extending and circumferentially extending countersunk surface 15 which is adapted to radially overlie the bearing surface 28 of pad 20, and the countersunk surface 15 on the rotating journal 12 is bounded at the opposite axial ends thereof by thrust shoulders on journal 12, respectively indicated at 17A and 17B which engage thrust shoulders 23A, 23B on bearing pads 20.

The oil pressure developed in the lubricating oil film at the interface between the radially inner bearing surface 28 of each respective bearing pad portion 22 and the radially outer surface 15 of trunnion 12 supports the load L and during normal running operation of the rotary grinding mill is due to hydrodynamic action of the lubricating fluid (due to relative rotation between surfaces 28 and 15), the low pressure oil for hydrodynamic lubrication being supplied at oil distribution grooves 34 and 36 as will be described in more detail hereinafter. Alternatively, the oil film pressure between the bearing and journal may be due to hydrostatic operation of lubricant supplied by a relatively high pressure external pump, only at certain times during the operation of the grinding mill, particularly during the start-up, inching, and shut-down operation of the grinding mill. High pressure oil for hydrostatic operation may be supplied through centrally located discharge opening 31 (FIG. 5) in bearing face 28 of the bearing pad 20. Discharge opening 31 is connected by suitable internal passages 33 in pad 20 to a source of high pressure oil.

This patent application is concerned with an improved apparatus and method related to the hydrodynamic lubrication system for the rotating journal, in which the lubricating oil is supplied to the system by a relatively low pressure pump, and in which the oil pressure is developed between the pivoted bearing pad surface 28 and the journal surface 15 by the hydrodynamic lubricating action provided by the rotation of the journal relative to the pivoted bearing pads.

The respective edges 30 and 32 are herein designated as the "leading" and "trailing" edges, respectively, of the pivoted bearing pad relative to the counterclockwise direction of rotation shown in FIG. 3. The term "leading edge" is defined as that edge of the pivoted bearing pad 20 which is first passed by a given point P on the periphery of the rotating journal for a given direction of rotation of the journal; while the term "trailing edge" is hereby defined as that edge of the pivoted bearing pad which is last reached by the given point P on the periphery of the rotating journal for the same direction of rotation of the journal. Thus, it will be seen in accordance with this definition that the point P on the periphery of trunnion 12 first reaches the edge 30 of the pivoted bearing pad 20 in the counterclockwise direction of rotation as viewed in FIG. 3 and hence, the term "leading edge" is applied to edge 30; while the edge 32 is last reached by the point P on the trunnion in the counterclockwise direction as viewed in FIG. 3; and hence, the term "trailing edge" is applied to the edge 32 of the pivoted bearing pad 20 relative to the counterclockwise rotation of journal 12 in FIG. 3.

If the direction of rotation of journal 12 is reversed, the relative location of the "leading" edge and "trailing" edge on the pivoted bearing pad 20 is reversed. Thus, in the view of FIG. 4 in which journal 12 is assumed to be rotating in a clockwise direction, edge 32 of pivoted bearing pad 20 is the "leading" edge, while edge 30 is the "trailing"edge.

An oil distribution groove 34 is positioned in the radially inner face 28 of bearing pad 20 contiguous but spaced a definite distance counterclockwise of edge 30 relative to the view of FIG. 3. Similarly, an oil distribution groove 36 is positioned in the radially inner face 28 of bearing pad 20 contiguous but spaced a definite distance clockwise of edge 32 relative to the view of FIG. 3.

A relatively low pressure (such as, for example, in the approximate range 15 to 100 pounds per square inch) oil pump 40 is provided with dual discharge outlets 40A and 40B, respectively, which are respectively connected by outlet lines or conduits 42 and 44 to the respective oil distribution grooves 34 and 36 which are contiguous but spaced from the respective edges 30 and 32. Pumps having dual discharge outlets are well known in the art and are commercially available. They are in effect "double pumps" and are characterized by the fact that a change in the hydraulic resistance to which one of the dual outlets 40A or 40B is connected will not appreciably affect the flow or pressure of the other outlet. A commercially available pump having a split flow for two separate outlets is manufactured by Dynex Company, 7770 Capitol Drive, Pewaukee, Wisconsin 53072 under the designation "Dynex Model TF 2006-1807."

Suitable internal passages such as 35 (FIG. 6) in the bearing pads 20 are adapted to place the respective oil distribution grooves 34, 36 in fluid communication with the respective pump outlet lines 42, 44. Spring biased check valves 46A and 46B are connected in the respective pump outlet lines 42 and 44, the check valves permitting flow in the output direction of the pump but preventing reverse flow of oil in the lines 42 and 44 toward the pump 40. The suction line or conduit 47 to the pump communicates with an oil pump S. A bypass valve 48 which may be selectively moved to open or closed position provides a controllable bypass to sump S through bypass line 49 from pump output line 42. Similarly, a controllable bypass valve 50 which may be selectively opened or closed is connected in a bypass line 52 between pump output line 44 and sump S.

In the diagramatic view shown for counterclockwise journal rotation in FIG. 3, bypass valve 48 is fully closed and bypass valve 50 is fully open. Thus, oil is being supplied from pump 40 through output line 42 to oil distribution groove 34 near leading edge 30 of pivoted bearing pad 20. Under the same conditions (FIG. 3), the oil which passes from pump 40 through output line 44 is bypassed through open bypass valve 50 and through bypass line 52 back to sump S. Hence, the pressure profile of the oil film at the interface between pivoted bearing pad 20 and rotating journal 12 is as shown in the schematic view of FIG. 3, since the oil distribution groove 34 near "leading" edge 30 is at pump supply pressure, while the oil distribution groove 36 near "trailing" edge 32 is at sump pressure which is essentially at zero gauge pressure. Thus, the bearing pad area between the "trailing" oil distribution groove 36 and the trailing edge 32 is at nearly zero pressure which in effect cancels out the journal supporting area of bearing 20 between oil distribution groove 36 and trailing edge 32. Under these circumstances, the effective arcuate length L of bearing pad 20 extends from "leading" edge 30 to oil distribution groove 36. Since the pivotal support 24 of the pivoted bearing pad 20 is at all times centrally located mechanically between the opposite edges 30 and 32, it can be seen that the "cancellation" of the effective bearing pad area between groove 36 and trailing edge 32 as just described causes the pivotal support 24 of the bearing pad to be offset relative to the midpoint of the effective arcuate length L of bearing pad 20, and that pivotal support 24 is relatively further from the leading edge 30 than from the "effective" trailing edge of bearing pad 20, the effective trailing edge under the circumstances of FIG. 3 being oil distribution groove 36. Due to the effective cancellation of the portion of the bearing pad between the trailing oil distribution groove 36 and the trailing edge 32, the effective portion of the bearing pad lying on the same side of pivot 24 as the leading edge 30 is greater than the effective portion of the bearing pad lying on the same side of the pivot point as the trailing edge 32 since part of the effective area of the bearing pad near edge 32, namely, that portion between oil distribution groove 36 and the trailing edge 32 has in effect been cancelled. This is the condition which should prevail for the counterclockwise direction of rotation of the journal as shown in FIG. 3, since the longer "level arm" on the side of leading edge 30 facilitates the formation of the oil wedge W in the region of the leading edge 30 for the assumed counterclockwise direction of rotation as viewed in FIG. 3. As just explained, this has been accomplished merely by changing the pressure profile of the oil film on face 28 of bearing pad 20 rather than by mechanically shifting the location of the pivot point 24, since the mechanical and physical location of the pivot point remains the same throughout. The position of the pivot point 24 relative to the effective length L of the bearing pad can be varied from the condition of FIG. 3 to the condition of FIG. 4, as will be explained.

Referring now to the diagrammatic view shown for clockwise journal rotation in FIG. 4, it will be realized, as previously explained, that edge 32 of the pivoted bearing pad 20 is not the "leading" edge and that edge 30 of bearing pad 20 is now the trailing edge. Under these circumstances, bypass valve 48 is fully opened and bypass valve 50 is fully closed. Thus, oil is being supplied at pump pressure through line 44 to oil distribution groove 36 near the now leading edge 32. However, since bypass valve 48 is open, oil passing through pump output line 42 toward the now trailing oil distribution groove 34 is bypassed to sump S through bypass valve 48 and bypass line 49. Hence, the oil film pressure profile at the interface between pivoted bearing pad 20 and rotating journal 12 is as shown in FIG. 4, since the oil distribution groove 36 near leading edge 32 is substantially at pump pressure, while oil distribution groove 34 near the now trailing edge 30 is at sump pressure which is essentially at zero gauge pressure. In the same manner as previously described in connection with FIG. 3, but reversed from the situation of FIG. 3, the bearing pad area in FIG. 4 between the trailing oil distribution groove 34 and the now trailing edge 30 is at nearly zero pressure which in effect cancels out the journal supporting area of bearing 20 between oil distribution groove 34 and the now trailing edge 30. Under the circumstances of FIG. 4, the effective arcuate length L' of bearing pad 20 extends from the now leading edge 32 to oil distribution groove 34. Since the pivotal support 24 of pivoted bearing pad 20 is at all times centrally located between the opposite edges 30 and 32, it can be seen that under the circumstances described in connection with FIG. 4, the pivotal support 24 is offset relative to the midpoint of the effective length L' of bearing pad 20, and is relatively further from the now leading edge 32 than from the "effective" trailing edge of bearing pad 20, the effective trailing edge under the circumstances of FIG. 4 being oil distribution groove 34.

The effective offset relation of the pivot point of the bearing pad 20 as described in connection with FIGS. 3 and 4 has the advantage that it facilitates the formation of a hydrodynamic oil wedge at the leading edge for the given direction of rotation, without the necessity of mechanically shifting the location of bearing pad pivot point 24 with change in direction of journal rotation. Instead, in accordance with the invention, the pivot point is caused to by suitably offset in either direction of rotation by controlling the pressure profile of the oil film on the journal bearing surface of the pivoted bearing pad.

Figure 7:
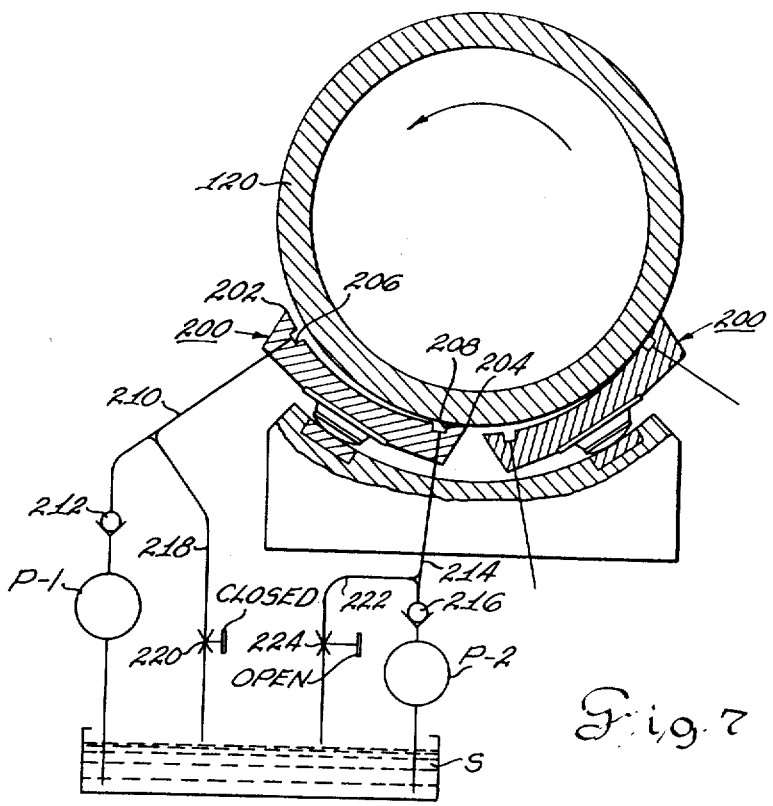
FIG. 7 is a schematic view showing the use of two separate pumps for providing an oil supply to the opposite oil distribution grooves of a given pivoted bearing pad.

Referring now to FIG. 7, there is schematically shown a modified arrangement in which two separate pumps are used for supplying lubricant to the oppositely disposed oil distribution grooves of a given pivoted bearing pad. Thus, there is shown in FIG. 7 a journal 120 which is supported for rotation by a pair of pivoted bearing pads each generally indicated at 200. Each pivoted bearing pad 200 is centrally pivoted. Pivoted bearing pad 200 includes oppositely disposed oil distribution grooves 206 and 208 similar to those described in the previous embodiment and which respectively lie contiguous but spaced from the leading and trailing edges 202 and 204, relative to the counterclockwise direction of rotation of journal 120 shown in FIG. 7. Instead of using a dual discharge pump such as that described in connection with the embodiment of FIGS. 3 and 4, two separate relatively low pressure pumps P-1 and P-2 are connected to the respective oil distribution grooves 206 and 208. Thus, pump P-1 is connected by discharge line 210 in series with check valve 212 to oil distribution groove 206. Pump P-2 is connected by discharge line 214 in series with a check valve 216 to the oil discharge groove 208. Check valves 212 and 216 are similar to those described in the embodiment of FIGS. 3 and 4. The discharge line 210 of pump P-1 has connected thereto a drain line 218 in series with a controllable bypass valve 220 by means of which the oil discharge of pump P-1 can be bypassed to sump S through drain line 218 by opening valve 220. Similarly, a drain line 222 in series with a controllable bypass valve 224 connects discharge line 214 of pump P-2 to sump S in series with valve 224.

In accordance with the teaching of the previous embodiment, when journal 120 is rotating in a counterclockwise direction as viewed in FIG. 7, bypass valve 220 is closed and the output of pump P-1 is fed to oil distribution groove 206. Simultaneously, if pump P-2 is operating, bypass valve 224 is opened to drain the output of pump P-2 back to sump S. Thus, oil distribution groove 206 is maintained at pump pressure and groove 208 contiguous trailing edge 204 is maintained at substantially sump pressure which is essentially zero gauge pressure. However, in the embodiment of FIG. 7, since two separate pumps P-1 and P-2 are used, pump P-2 can be deenergized under the circumstances of FIG. 7 where journal 120 is rotating counterclockwise and edge 204 is the trailing edge. In this case, with pump P-2 deenergized, it is only necessary that valve 224 be opened to connect groove 208 to the pump S, which is essentially at zero pressure. It will be understood, of course, that the situation just described for counterclockwise rotation of journal 120 is reversed if journal 120 is rotating in a clockwise direction relative to the view of FIG. 7, in which case edge 204 becomes the leading edge and edge 202 becomes the trailing edge. In this latter case, of course, the output of pump P-2 is fed to oil distribution groove 208 with valve 224 closed and the now trailing groove 206 (clockwise rotation) is connected to sump through the now opened valve 220 with pump P-1 deenergized. The arrangement just described will provide the proper oil pressure profile in either direction of rotation of journal 120 to obtain the offset pivot effect described in connection with FIGS. 3 and 4.

Figure 8:
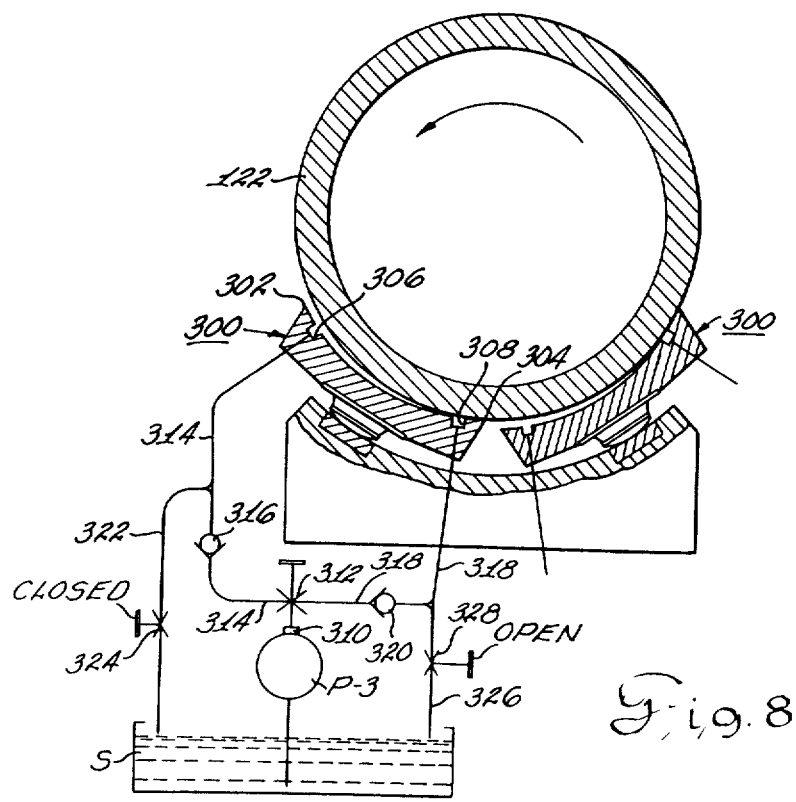
FIG. 8 is a schematic view of a modified arrangement in which an outlet pump having a single discharge outlet is used to supply lubricant to the opposite oil distribution grooves of a given pivoted bearing pad.

Referring now to FIG. 8, there is shown a still further modified hydraulic circuit arrangement which may be used. There is shown in FIG. 8 a journal 122 supported for rotation by a pair of pivoted bearing pad members 300. Each pivoted bearing pad 300 is centrally pivoted. Journal 122 is assumed to be rotating in a counterclockwise direction relative to the view of FIG. 8. Pivoted bearing pad 300 includes oppositely disposed oil distribution grooves 306 and 308 which are respectively contiguous but spaced from the edges 302 and 304 of the pivoted bearing pad 300. For the assumed counterclockwise direction of rotation, the edge 302 is the "leading" edge and the edge 304 of the pivoted bearing pad is the "trailing" edge. A relatively low pressure pump P-3 having a single discharge outlet 310 is provided. The output of the discharge opening 310 of pump P-3 is connected to a two-way valve 312. The two-way valve 312 is provided with two outlets, one of which is connected to discharge lines 314 in series with a check valve 316 to oil distribution groove 306. The other outlet of two-way valve 312 is connected to discharge line 318 in series with a check valve 320 to oil distribution groove 308. Check valves 316 and 320 are similar to those described in connection with the embodiment of FIGS. 3 and 4. A drain line 322 is connected from a discharge line 314 in series with a controllable bypass valve 324 to sump S. Similarly, a drain line 326 is connected from discharge line 318 in series with a controllable bypass valve 328 to sump S.

For the assumed counterclockwise rotation relative to FIG. 8, two-way selector valve 312 is moved to a position in which it communicates the discharge outlet 310 of pump P-3 through discharge line 314 to oil distribution groove 306 adjacent the now leading edge 302 of pivoted bearing pad 300. In this position of two-way selector valve 312, communication from discharge outlet 310 of pump P-3 to discharge conduit 318 is closed and pump P-3 does not supply oil to groove 308. The valve 324 in drain line 322 connected to discharge line 314 is closed. Hence, the full output of pump P-3 passes through discharge line 314 to oil distribution groove 306. Under the same set of circumstances, with discharge line 318 leading to oil distribution groove 308 disconnected from pump P-3 by the two-way selector valve 312, drain valve 328 is fully opened to connect line 318 leading to oil distribution groove 308 to sump. Hence, under the counterclockwise direction of rotation of journal 122 shown in FIG. 8, the oil pressure of pump P-3 is delivered to oil distribution groove 306 contiguous the leading edge 302 and the oil distribution groove 308 contiguous the trailing edge 304 is at sump pressure (essentially zero gauge pressure) so that the pressure profile on the pivoted bearing pad 300 will be essentially similar to that described in connection with FIG. 3.

It will be understood, of course, that in the arrangement of FIG. 8 if journal 122 is rotating in a clockwise direction relative to FIG. 8 that the two-way selector valve 312 is turned to a position in which the oil distribution groove 308 is connected to the output of pump P-3 through discharge line 318 with drain or bypass valve 328 being fully closed; and, under these same circumstances, discharge line 314 and oil distribution groove 306 near the now trailing edge 302 of the pivoted bearing pad 300 is disconnected from pump P-3. Under these circumstances, the drain valve 324 is fully opened connecting oil distribution groove 306 to sump. Hence, under the second set of circumstances just described, in which oil distribution groove 308 is connected to the output of pump P-3 and oil distribution groove 306 is disconnected from the output of pump P-3, with drain valve 328 closed and with drain valve 324 open, the pivoted bearing pad 300 will have an oil pressure profile similar to that described in connection with FIG. 4.

The dual discharge pump arrangement shown in FIGS. 3 and 4 is illustrated in connection with a single pivoted bearing pad. Preferably, if a dual discharge pump is used as described in connection with FIGS. 3 and 4, the hydraulic circuit and pump arrangement of FIGS. 3 and 4 is repeated for each separate pivoted bearing pad. Thus, in this case, assuming there were four pivoted bearing pads as seen in FIG. 1, a separate dual discharge pump arrangement would be provided for each separate pivoted bearing pad. Thus, for the structure in FIG. 1 having four pivoted bearing pads, a total of four dual discharge pumps would be required.

Similarly, in the arrangement of FIG. 7 in which two separate pumps are provided for a single pivoted bearing pad 200, preferably the hydraulic circuit and pump arrangement for FIG. 7 is repeated for each separate bearing pad, so that assuming four pivoted bearing pads were used as in FIG. 1, a total of eight pumps would be required. However, it would also be possible to use two pumps such as P-1 and P-2 and to connect the plurality of oil distribution grooves corresponding to groove 206 in parallel with each other across the output of the pump P-1, and similarly to connect the plurality of oil distribution grooves corresponding to groove 208 in parallel with each other across the output of pump P-2.

Similarly, in the arrangement of FIG. 8 where a single outlet pump P-3 is provided in conjunction with a two-way selector valve such as 312, it is possible to connect all of the corresponding oil distribution grooves 306 of a plurality of pivoted bearing pads in parallel with each other to the output of one side of the two-way selector valve 312 and to similarly connect all of the oil distribution grooves such as 308 of a plurality of pivoted bearing pads in parallel with each other to the output of the opposite side of the two-way selector valve 312. Thus, movement of the selector valve 312 in one direction will connect all of the grooves such as 306 to the output of pump P-3 and the movement of the two-way valve 312 in the opposite direction will connect all of the grooves such as 308 to the output of pump P-3.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination a rotable journal, a pivoted bearing pad in supporting relation to said journal for bidirectional rotation of said journal, stationary structure supporting said pivoted bearing pad for pivotal movement, said pivoted bearing pad including a journal bearing surface extending in a generally circumferential and also in a generally axial direction of said journal whereby to be in supporting relation to said journal for bidirectional rotation of said journal, said journal bearing surface including opposite circumferentially spaced first and second edges, said first and second edges being respectively the leading and the trailing edges for one direction of rotation of said journal, said first and second edges being respectively the trailing and the leading edges for the opposite direction of rotation of said journal, said leading edge being at the circumferential end of said pivoted bearing pad first reached by a given point on the periphery of said journal for any given direction of rotation of said journal, said trailing edge being at the circumferential end of said pivoted bearing pad last reached by said given point for any given direction of rotation of said journal, said bearing pad including a pivotal support located substantially midway between said first and said second edges, a first and a second lubricant discharge means in the journal bearing surface of said pivoted bearing pad respectively contiguous but spaced from said first and said second edges, means effective on both directions of rotation of said journal for connecting a pressurized supply of lubricant to the lubricant discharge means contiguous the leading edge of said pivoted bearing pad for any given direction of rotation of said journal, and for discontinuing the flow of lubricant to the lubricant discharge means contiguous the trailing edge of said pivoted bearing pad for any given direction of rotation of said journal, whereby to provide a lubricant film pressure profile at said journal bearing surface of said bearing pad which causes an offset pivot effect particular for each direction of rotation of said journal member while still maintaining a mechanically centrally located pivot for said pivoted bearing pad.

2. The combination defined in claim 1 in which said means for discontinuing the flow of lubricant to the lubricant discharge means contiguous said trailing edge includes means connecting the lubricant discharge means contiguous said trailing edge to a sump which is at a substantially lower pressure than said pressurized supply.

3. The combination defined in claim 1 including a pump having a first and a second discharge outlet, a first and a second discharge line respectively connected to said first and said second discharge outlet, said first discharge line being connected to said first lubricant discharge means, said second discharge line being connected to said second lubricant discharge means, a corresponding drain line connecting each of said first and said second discharge lines to a sump, a valve in each respective drain line to control the passage of lubricant through each respective drain line to said sump, whereby for any given direction of rotation of said journal said lubricant discharge means contiguous the leading edge may be maintained at pump output pressure and said lubricant discharge means contiguous the trailing edge may be maintained at substantially sump pressure.

4. The combination defined in claim 1 including a first and a second pump, means connecting the output of said first pump to said first lubricant discharge means, means connecting the output of said second pump to said second lubricant discharge means, a first drain line connecting said first lubricant discharge means to a sump, a second drain line connecting said second lubricant discharge means to a sump, and valve means in each drain line for selectively connecting to the sump or for isolating from the sump the corresponding lubricant discharge means.

5. The combination defined in claim 1 in which each said lubricant discharge means comprises a lubricant distribution groove extending for a substantial portion of the axial length of said pivoted bearing pad.

6. A pivoted bearing pad adapted to be in supporting relation to a journal member for bidirectional rotation of said journal member, said pivoted bearing pad being adapted to be supported for pivotal movement by stationary structure, said pivoted bearing pad including a journal bearing surface extending in a generally circumferential and also in a generally axial direction of said journal member whereby to be in supporting relation to said journal member for bidirectional rotation of said journal members, said journal bearing surface including opposite circumferentially spaced first and second edges, said first and second edges being respectively the leading and the trailing edges for one direction of rotation of said journal, said first and second edges being respectively the trailing and the leading edges for the opposite direction of rotation of said journal, said leading edge being at the circumferential end of said pivoted bearing pad first reached by a given point on the periphery of said journal member for any given direction of rotation of said journal member, said trailing edge being at the circumferential end of said pivoted bearing pad last reached by said given point for said any given direction of rotation, said bearing pad including a pivotal support located substantially midway between said first and said second edges, a first and a second lubricant discharge means in the journal bearing surface of said pivoted bearing pad respectively contiguous but spaced from said first and said second edges, the lubricant discharge means contiguous the leading edge of said pivoted bearing pad for any given direction of rotation of said journal member being adapted to be connected to a pressurized supply of lubricant, the lubricant discharge means contiguous the trailing edge of said pivoted bearing pad for any given direction of rotation of said journal member being adapted to have the supply of lubricant thereto discontinued, whereby to provide a lubricant film pressure profile at said journal bearing surface of said bearing pad which causes an offset pivot effective particular for each direction of rotation of said journal member while still maintaining a mechanically centrally located pivot for said pivoted bearing pad.

7. A pivoted bearing pad as defined in claim 6 in which the lubricant discharge means contiguous said trailing edge on any given direction of rotation is adapted to be connected to a sump which is at a substantially lower pressure than the pressurized supply to which the lubricant discharge means contiguous said leading edge is connected.

8. A pivoted bearing pad as defined in claim 6 in which each said lubricant discharge means comprises a lubricant distribution groove extending for a substantial portion of the axial length of said pivoted bearing pad.

9. The method of providing lubrication for a pivoted bearing pad which is in supporting relation to a journal for bidirectional rotation of said journal and in which said bearing comprises opposite circumferentially spaced first and second edges and a pivotal support located substantially midway between said first and second edges, said first and second edges being respectively the leading and the trailing edges for one direction of rotation of said journal, said first and second edges being respectively the trailing and the leading edges for the opposite direction of rotation of said journal, said leading edge being at the circumferential end of said pivoted bearing pad first reached by a given point on the periphery of said journal for any given direction of rotation of said journal, said trailing edge being at the circumferential end of said pivoted bearing pad last reached by said given point for any given direction of rotation, and in which said bearing pad comprises a first and a second lubricant discharge means in the journal bearing surface of said pivoted bearing pad, said first and second lubricant discharge means being respectively located contiguous but spaced from said first and said second edges, said method comprising the steps of:

1. connecting a pressurized supply of lubricant to the lubricant discharge means which is contiguous the edge of said pivoted bearing pad which is "leading" for any given direction of rotation of said journal; and 2. operating at substantially lower discharge pressure than said pressurized supply the lubricant discharge means contiguous the edge of said pivoted bearing pad which is "trailing" for the particular given direction of rotation of said journal.

10. The method defined in claim 9 in which step (2) comprises the step of connecting said lubricant discharge means referred to in step (2) to a sump which is at a substantially lower pressure than said pressurized supply.

11. The method defined in claim 9 in which said sump is at substantially zero gauge pressure.

12. The method defined in claim 9 which comprises the steps of continuously connecting a pressurized supply of lubricant to each of said first and second lubricant discharge means during rotation of said journal, but bypassing to a sump the pressurized lubricant before it reaches the one of said lubricant discharge means which is located contiguous the edge of said pivoted bearing pad which is trailing for the given direction in which said journal is rotating.

* * * * *